Sept. 28, 1926. 1,601,609
S. B. BROWN
COMBINED TRACTOR AND PLANT
Filed August 11, 1923 3 Sheets-Sheet 1

Inventor:
S. B. Brown.
By Hagard and Miller
Attorneys.

Sept. 28, 1926.

S. B. BROWN 1,601,609

COMBINED TRACTOR AND PLANT

Filed August 11, 1923  3 Sheets-Sheet 2

Patented Sept. 28, 1926.

1,601,609

UNITED STATES PATENT OFFICE.

SAMUEL BARTON BROWN, OF LOS ANGELES, CALIFORNIA.

COMBINED TRACTOR AND PLANT.

Application filed August 11, 1923. Serial No. 656,781.

My present invention being a combined tractor and plant, it should be understood that it is an object of this invention to provide a power organization which may permit a tractor to be used alternatively or simultaneously both for draft purposes and for power purposes; and, in a preferred embodiment of my invention, I may provide a tractor, such as a Fordson tractor, with a supplemental frame adapted to be removably secured to the body of said tractor in such manner as to permit of a forward elongation of the wheel base.

It is an object of this invention to provide a portable power plant, such as a Fordson tractor having a belt wheel, with means for the support and utilization of an additional machine operated by the power of said tractor; and, in one preferred embodiment of my invention, I may provide means permitting the front wheels of a tractor, with their stub axles, to be removed from their usual position and temporarily or permanently secured at the front end of a supplemental frame constituting a forward extension provided with an underslung frame adapted to support a power-applying machine, such as a compressor, a dynamo, or other machine.

It is an object of this invention to provide means for extending at will the wheel base of a tractor in such manner as to permit the tractor to carry a useful load upon its own wheels; and when this load constitutes a machine such as an air compressor or a spray pump, I may provide means permitting a driving of the same, by the motor of said tractor, either when said tractor is advancing or when it is stationary.

It is an object of this invention to provide a power-applying machine with a support which may be secured at will to the body of a tractor, or which may be used independently thereof, said support preferably comprising frame elements which may be supported from a rear axle housing, and which may in turn support the original front axle of a tractor, an additional axle being pivotally secured near the front end of said frame element.

It is an incidental object of this invention to provide means for carrying upon a supplemental front axle both the weight of that load which normally rests thereon and the weight of a power-applying machine; and, for this purpose, I may employ a supplemental frame extending forward beyond the original front end of a tractor and provided with means for supporting an extension of the steering rod and also with reinforcing means of any preferred character, said reinforcing means being optionally adapted to support any additional or auxiliary structure, such as an overhead canopy.

As indicated above, it is an object of this invention to provide means which may be added at will to a tractor, without necessitating structural changes in the tractor proper, and permitting the tractor to continue in service as a draft appliance but permitting its wheels to carry also a removable driven or power-applying machine, such as a pump or a compressor or a concrete mixer, which may be operated by the motor of said tractor either during its advance, as in the spraying of trees or crops, or while the tractor is stationary, as in the mixing of concrete for a fixed structure.

Other objects of my invention will appear from the following description of a preferred embodiment thereof, and from the appended claims, taken in connection with the accompanying drawings, in which Fig. 1 is a side elevation, with parts broken away, the auxiliary frame of this tractor being shown as supporting a pump or compressor and a tank.

Figure 1:
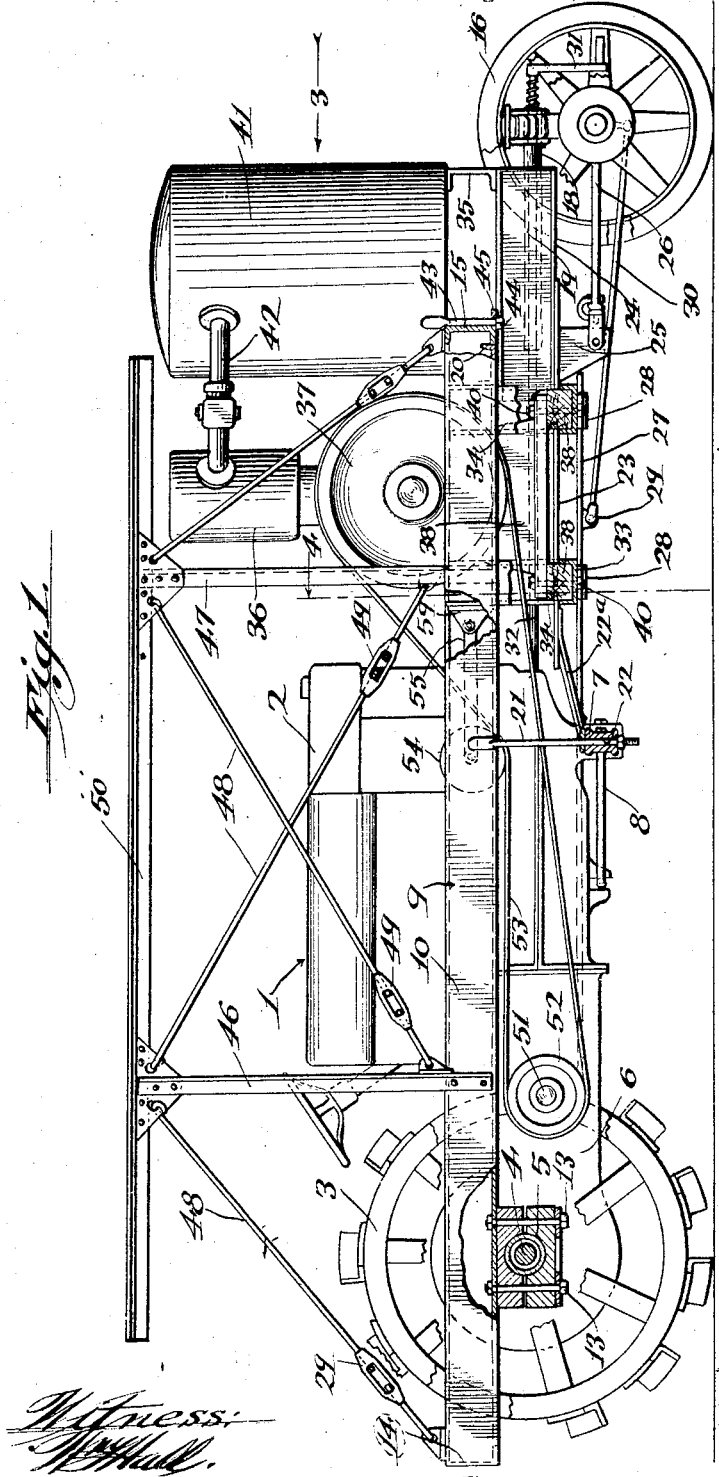

Referring in detail to the parts of that specific embodiment of my invention which I have chosen for purposes of illustration, 1 may be regarded as a Fordson or similar tractor, provided with a usual radiator 2, near the forward end thereof, and with drive wheels 3, secured to an axle 4, guarded by a housing 5, integral with the body 6 of said tractor, whose forward end may have been originally pivotally supported by an axle 7, additionally connected with said body by means of radius rods 8.

Coming now to the strictly novel elements comprised in my invention, I may provide an auxiliary frame 9, comprising side elements 10, shown as bent in a horizontal plane in such a manner that a comparatively narrow rear portion of the said auxiliary frame may be securely clamped, as by means of blocks 11 and plates 12, shown as secured by bolts 13, to the respective axle housings 5, the rear element 14, and the front element 15, of the said auxiliary frame being shown as formed also of channel iron, and the forward end of said auxiliary frame being shown as supported from ground wheels 16 (which may have been removed, together with their stub axles, from the original front axle 7) by means comprising a supplemental front axle 17 and a sleeve or pipe 18, upon which said axle may be transversely pivoted at its center, the said pipe 18 being secured, as by welding, to each of a pair of channel irons 19, which may be welded or otherwise secured also to the mentioned front horizontal element 15 of the said auxiliary frame, and to additional strengthening elements such as the channel iron 20, parallel therewith and secured at its ends to the side elements 10 of said auxiliary frame.

In order to support the original or alternative front axle 7 from the auxiliary frame 9, any suitable means may be provided, but I prefer to employ for this purpose straps or suspending rods 21, shown as bent and extending through the bearing apertures 22, by which stub axles were originally connected to the axle 7, the mentioned suspending straps or rods 21 being preferably steadied by means of diagonal straps 22ª, through which the rods 21 may extend, the converging ends of the straps 22 being shown as secured to a bed plate 23, which may be welded or otherwise secured to the lower surfaces 24 of the channel irons 19, the said bed plate being moreover adapted to carry a bracket 25, depending therefrom, and supporting supplemental radius rods 26, extending to and steadying the axle 17.

In order to provide for the steering of the front wheels 16 of the described organization, when they are positioned upon the ends of the axle 17, any suitable means may be provided, but I find it advantageous to employ for this purpose a connecting means comprising the slide 27, which may be secured to the original steering rod SR by means of a ball and socket joint SJ, the said slide being shown as guided by plates 28, 28′ and as provided with an additional universal bearing 29, pivotally supporting the supplemental steering rod 30, connected with the stub axles of the front wheels in a usual manner.

In order to provide for the starting of the motor of a tractor provided with a forward extension of the character described, I may provide a usual crank 31 with an extension 32, so that when this extension is inserted through the pipe or sleeve 18, a squared end or the like upon said extension may effect a suitable engagement to start the motor of the tractor.

In order to provide for supporting a desired power-applying machine from the described auxiliary frame 9, any desired additional frame structure may be employed; but I suggest the employment, for this purpose, of an underslung frame comprising the substantially horizontal channel irons 33 integral or connected with the vertical channel irons 34, which may be welded or otherwise secured to the side elements 10 of the mentioned auxiliary frame, the horizontal channel irons 33 being adapted to provide support for the mentioned guide plates 28 and being also preferably secured to the bed plate 23 to which the channel irons 19 are secured, as already described, these last mentioned channel irons being adapted to carry, at their forward ends, a transverse block or section of channel iron 35, shown as extending upward to the same level as the top of the transverse frame element 15, for a purpose hereinafter described.

In order to support a machine such as the pump or compressor 36, provided with a drive wheel 37 and base plate 38, means such as the blocks 39 and the bolts 40 may be employed; and, when a tank 41, or the like, is to be associated with a power-applying machine of the character described, and connected thereto by means of a pipe 42, or otherwise, such tank may be supported by means comprising the front element 15 of the auxiliary frame 9 and the mentioned block 35, each strap 43 being optionally welded or otherwise secured to the said tank and provided with a nut 44, shown as engaging beneath an apertured lug or projection 45, which may be integral with or secured to the horizontal frame element 15.

It will be obvious that the channel irons comprised in the auxiliary frame 9 may optionally be made of such size, shape and strength as to resist all strains to which the same may be subjected during the use of my combined tractor and plant; but when the said auxiliary frame is constructed of comparatively light channel iron, the same may be reinforced in any suitable way, as by means comprising the vertical angle irons 46, 47, whose upper portions may be secured to diagonal tension rods 48, shown as provided with turnbuckles 49, the lower ends of the angle irons 46 being preferably bolted to the side elements 10 of my auxiliary frame, and the upper ends of the said angle irons being preferably secured to a horizontal angle iron or rod or bar 50, by which a canopy or other protecting cover may optionally be supported.

For the transmission of power from a shaft 51 driven by the motor of the tractor, to the drive wheel 37 of any power-applying machine such as a pump or compressor, any preferred means may be employed, and my preferred means for this purpose comprises a pulley 52, secured to the shaft 51, and a belt 53, this belt being shown as provided with take-up means in the form of an idle pulley 54, upon an arm 55, shown as integral with a bearing sleeve 56, secured by a pivot bolt 57, extending through brackets 59, shown as bolted to the vertical elements 34 of the underslung frame by which any desired power-applying machine may be supported.

Although I have described one preferred embodiment of my invention, it should be understood that various features thereof might be independently employed, and also that various modifications might be made therein without departure from the spirit and scope of my invention as the same is indicated above and in the following claims.

Figure 2:
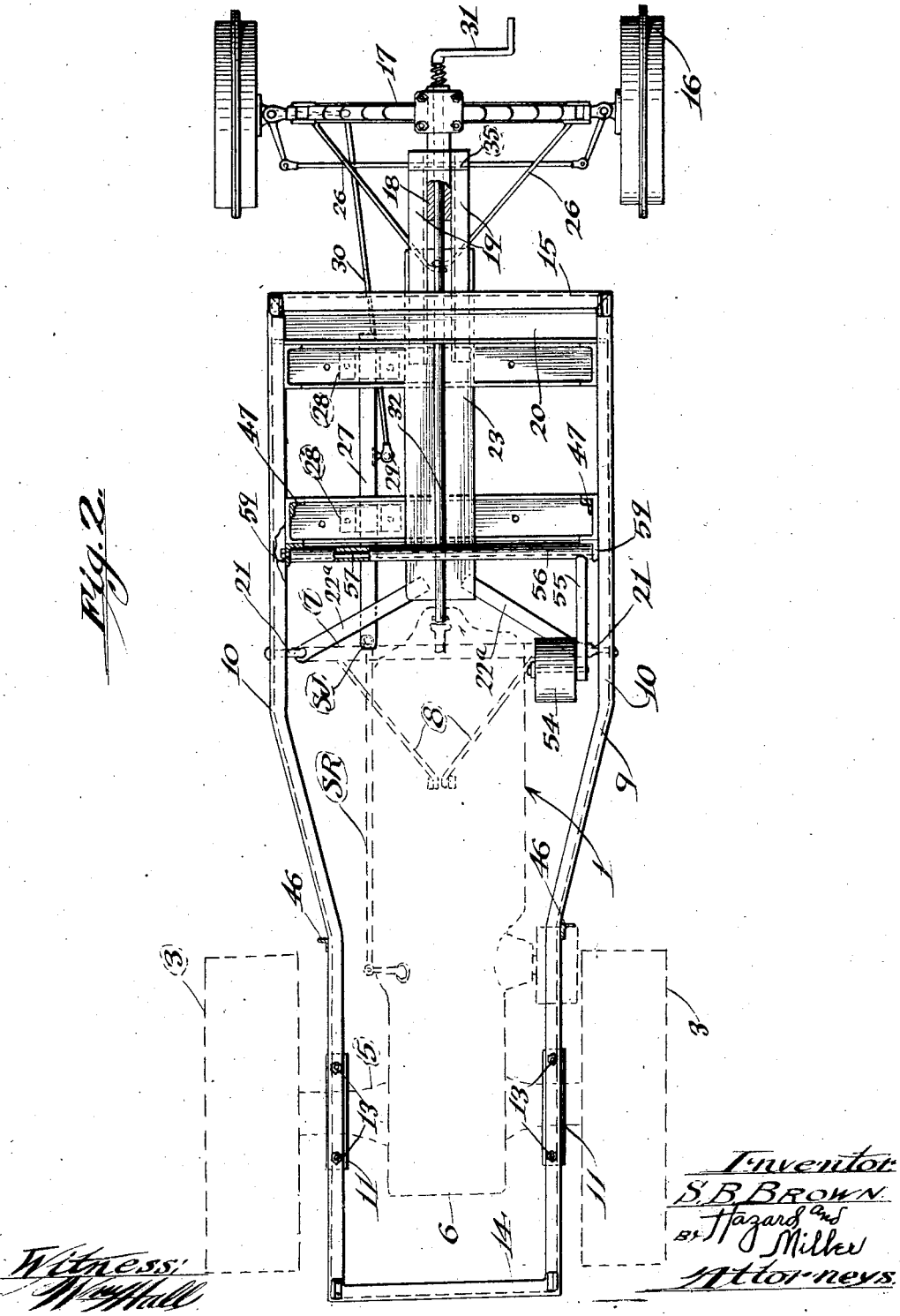
Fig. 2 is a plan view, corresponding to Fig. 1, but showing the tractor proper in dotted lines, and omitting all structures above the auxiliary frame.
Figure 3:
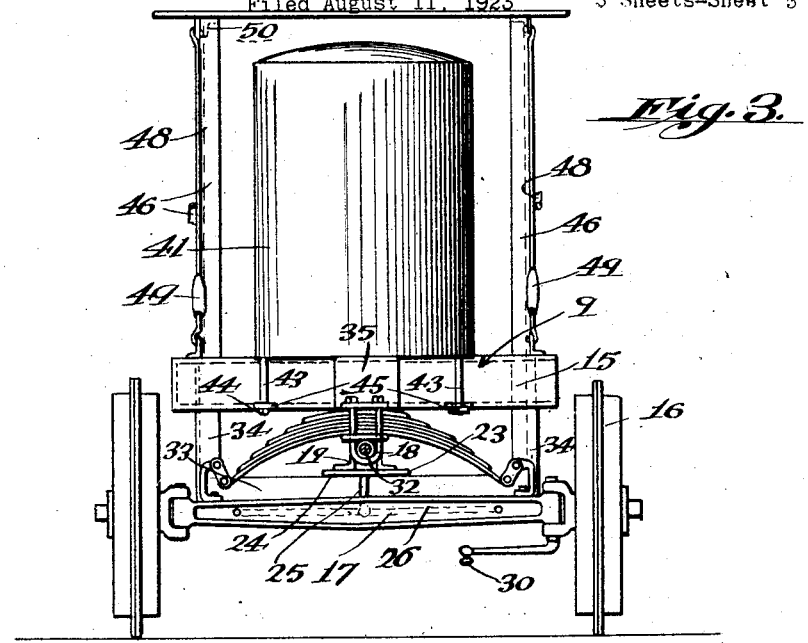
Fig. 3 is a front end elevation.
Figure 4:
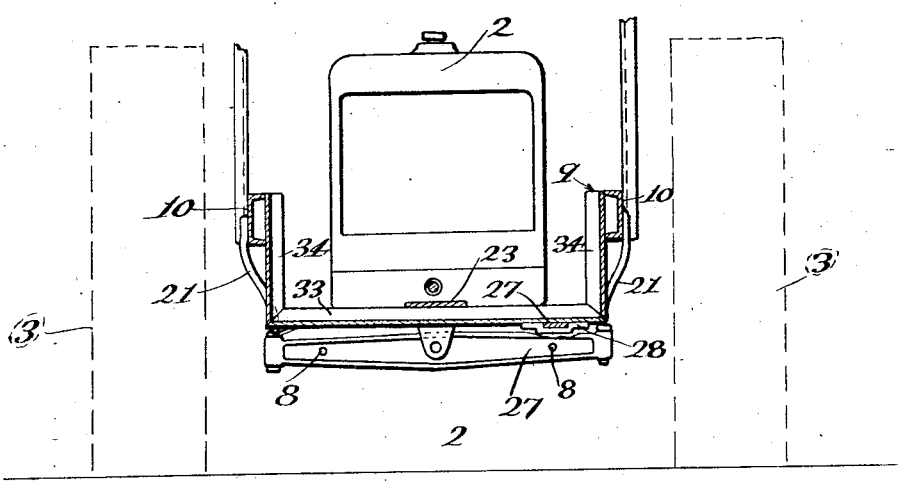
Fig. 4 is a transverse sectional view, which may be regarded as taken on the line 4—4 of Fig. 1.

It will be noted by the above construction designated simply, that I utilize an auxiliary frame 9 having side elements 10 attached to opposite sides of the rear axle housing and that an extension is attached at the forward end of the frame having a connection to the central portion of the supplemental front axle assembly; this assembly comprising the spring and the connection of the spring to the axle as clearly shown in Figs. 1, 2 and 3.

What I claim is:

1. A tractor provided with a wheel base forwardly elongated to permit the placing of a power-applying machine in front of its radiator, said tractor being provided with an auxiliary frame supported at three points and carrying a crank extension guarded by a sleeve constituting one of said points of support.

2. A converted tractor comprising in combination a tractor having a frame, a front and rear axle, an axle housing for the rear axle, wheels on the rear axle, an auxiliary frame having side elements attached to the opposite sides of the axle housing, a forwardly extending frame attached to the auxiliary frame below same and in front of the tractor frame, a front axle assembly having a spring and axle, the forward extension being attached to the central portion of the spring, thereby forming a three-point suspension for the auxiliary frame and the extension thereof, and a crank shaft mounted in the forward extension extending through the connection with the spring and adapted to be attached to the engine crank.

3. A converted tractor comprising in combination a tractor having a frame, front and rear axles, a housing for the rear axle and wheels on the rear axle, an auxiliary frame having substantially straight parallel side elements, rear and front elements connecting the said side elements, a forwardly extending frame comprising longitudinal channels connected to the front and side elements, a sleeve extending forwardly from said channels and a front axle assembly connected to said sleeve thereby forming a three-point suspension for the auxiliary frame and the forward extension thereof.

4. A converted tractor as claimed in claim 3, in which the said channels extend forwardly below the said side elements and the front element and a crank is mounted in the said sleeve adapted to be attached to the crank of the tractor engine.

5. A converted tractor as claimed in claim 3, in which the front axle assembly comprises a spring and a supplemental axle connection between the spring and the said sleeve, a bracket secured to the underside of the forwardly extending channels and radius rods extending from said bracket to the supplemental front axle.

6. A converted tractor comprising in combination a tractor having a frame, a front axle, a driving rear axle with wheels thereon, a rear axle housing, an auxiliary frame having side elements connected to the top of the rear axle housing on opposite sides, front and rear elements connecting said side elements, a forwardly extending frame comprising a pair of channels secured to the said side elements and the front elements below same, a sleeve connected to the channels, a spring connected to the sleeve, a supplemental axle connected to the spring, a bracket depending downwardly from the said channels, radius rods between the said bracket and the supplemental axle and suspension straps connecting the said side elements and the front axle of the tractor.

In testimony whereof I have signed my name to this specification.

SAMUEL BARTON BROWN.